United States Patent [19]

Brück et al.

[11] 4,301,240

[45] Nov. 17, 1981

[54] PHOTOGRAPHIC SILVER HALIDE MATERIAL WITH CROSS-LINKED PARTICULATE ACRYLIC OR METHACRYLIC POLYMER

[75] Inventors: Rolf Brück; Erich Wolff, both of Leverkusen, Fed. Rep. of Germany

[73] Assignee: Agfa-Gevaert Aktiengesellschaft, Leverkusen, Fed. Rep. of Germany

[21] Appl. No.: 973,900

[22] Filed: Dec. 28, 1978

[30] Foreign Application Priority Data

Jan. 5, 1978 [DE] Fed. Rep. of Germany ....... 2800466

[51] Int. Cl.$^3$ .......................... G03C 1/32; G03C 1/37
[52] U.S. Cl. .................................... 430/537; 430/510; 430/527; 430/531; 430/534; 430/535; 430/536; 430/950; 430/961; 430/496
[58] Field of Search ............ 96/87 A, 114, 67, 50 PL; 430/527, 531, 536, 537, 935, 950, 961, 510, 496

[56] References Cited

U.S. PATENT DOCUMENTS

| | | | |
|---|---|---|---|
| 2,043,906 | 6/1936 | Sheppard et al. | 96/67 |
| 2,751,315 | 6/1956 | Staehle | 96/50 PL |
| 2,992,101 | 7/1961 | Jelley et al. | 96/23 |
| 3,017,280 | 1/1962 | Yudelson | 96/114 |
| 3,201,251 | 8/1965 | Nadeau et al. | 96/87 A |
| 3,203,804 | 8/1965 | Cohen et al. | 96/114 |
| 3,493,379 | 2/1970 | Donoghue | 96/114 |
| 3,753,765 | 8/1973 | Morgan et al. | 96/87 A |
| 3,907,573 | 9/1975 | Franco et al. | 96/114 |
| 3,997,701 | 12/1976 | Ealding et al. | 96/87 A |
| 4,022,622 | 5/1977 | Timmerman et al. | 96/87 A |
| 4,047,958 | 9/1977 | Yoneyama et al. | 96/87 A |
| 4,070,189 | 1/1978 | Kelley et al. | 96/87 A |
| 4,126,460 | 11/1978 | Okishi | 430/950 |
| 4,142,894 | 3/1979 | Hori et al. | 430/950 |
| 4,168,979 | 9/1979 | Okishi et al. | 96/67 |

OTHER PUBLICATIONS

Guestaux, M., Research Disclosure, Disclosure #12737, pp. 32–33, 11/1974.

*Primary Examiner*—Charles L. Bowers, J.
*Attorney, Agent, or Firm*—Connolly and Hutz

[57] ABSTRACT

Photographic silverhalide containing materials having improved mechanical and electrostatic properties are obtained by adding to at least one of the layers of the material a cross-linked polymer of acrylic acid and/or methacrylic acid which is prepared either (a) by inverse emulsion polymerization of acrylic and/or methacrylic acid monomers in the presence of polyfunctional cross-linking monomers and an emulsifier and breaking of the emulsion and redispersion of the polymer particles in water; or (3) by emulsion polymerization of aliphatic esters of acrylic and/or methacrylic acid in water in the presence of polyfunctional cross-linking monomers and of an emulsifier, followed by saponification of the polymer.

7 Claims, No Drawings

PHOTOGRAPHIC SILVER HALIDE MATERIAL WITH CROSS-LINKED PARTICULATE ACRYLIC OR METHACRYLIC POLYMER

This invention relates to a photographic light sensitive material in which at least one of the layers contains cross-linked polymer salts introduced from an aqueous dispersion to improve the mechanical and electrostatic properties of the layers.

It is known that soluble polymer salts can be used in photographic materials, e.g. as antistatic agents, binders or matting agents. Examples of polymers suitable for this purpose include salts of polyacrylic acid, of polystyrene sulphonic acid, of copolymers which contain quarternary ammonium groups and of copolymers of methacrylic acid and methyl methacrylate. The use of these compounds has, however, various disadvantages.

Polymer salts having a low to medium degree of polymerization and a low molecular weight tend to diffuse from the layer into which they are originally introduced into an adjacent hydrophilic layer. This may have already occurred at a stage of casting or it may take place when the layer is subsequently coated with another layer. It is also found to occur during storage of the photographic materials, particularly at high relative humidity.

Polymer salts which are applied to the back of a photographic film as antistatic agents, such as the copolymers of acrylic acid, methacrylic acid and styrene sulphonic acid which are known for this purpose, frequently lose their effect when the rolls of film to which they have been applied are kept in storage for some time with the back of the material in contact with the hydrophilic emulsion layers. Under such conditions, the diffusion mentioned above occurs and the conductivity of the back layer may fall by a power of ten.

Although the disadvantages due to diffusion of the polymer salts can be overcome to some extent by using higher molecular polymer salts, this results in an increase in the viscosity of the casting mixtures, which is itself a disadvantage since photographic layers can generally only be prepared satisfactorily at viscosities of up to 30 cP. Even when higher viscosities can be used, however, up to 60% of the higher molecular polymer salts are liable to diffuse into the adjacent photographic layers.

Another disadvantage of the known polymer salts is that when used in photographic materials, they cause excessive swelling of the layers in the development baths. This may result in partial or complete detachment of the photographic layers from their substrate. All polymer salts which contain an average of more the 0.5 mol of salt groups per monomer unit have this disadvantageous effect.

Copolymers of methacrylic acid and methyl methacrylate which form a dispersion at a neutral pH have been disclosed in U.S. Pat. No. 2,992,101. These copolymers are used in protective layers of multi-layered colour photographic materials to prevent the formation of Newton Rings. Although the dispersions have a low viscosity and are fast to diffusion, the copolymers have the disadvantage that at higher pH values in the development baths they form alkali metal salts and dissolve.

Lastly, it is known that matted photographic layers may be prepared by milling gelatine powder in a volatile organic solvent such as ethyl alcohol which contains formaldehyde, replacing the solvent by another, apolar organic solvent such as benzene, evaporating off the apolar solvent and using the resulting hardened gelatine powder, optionally after redispersion in water, for matting photographic layers (U.S. Pat. No. 2,043,906). This process has the disadvantage that even the most intensive milling will only reduce the gelatine powder to relatively coarse particles which vary considerably in size. The matting obtained by using such matting agents in photographic layers is generally too coarse for most purposes.

It is an object of the present invention to develop aqueous polymer salt dispersions which may be added to casting compositions for photographic layers in order to improve the mechanical and electrostatic properties of the layers without at the same time having the disadvantages of the known polymer salts mentioned above.

The present invention relates to a photographic light sensitive material having at least one silver halide emulsion layer, characterized in that the photographic material contains, in at least one of the layers, a cross-linked polymer of acrylic acid and/or methacrylic acid which has a particle size in the dry state of from 0.01 to $5\mu$, preferably from 0.003 to $2\mu$, and a swelling factor in water of from 4 to 40, which polymer is prepared either:

(a) by inverse emulsion polymerization (water in oil) of acrylic and/or methacrylic acid monomers in the presence of polyfunctional cross-linking monomers and an emulsifier, breaking down of the emulsion and redispersion of the polymer particles in water; or (b) by emulsion polymerization of aliphatic esters of acrylic and/or methacrylic acid in water in the presence of polyfunctional cross-linking monomers and of an emulsifier, followed by saponification of the polymer.

The advantages of the dispersion of organic polymer salts used according to the present invention are that the dispersed particles, which have been cross-linked through covalent bonds, are resistant to diffusion, the dispersions have a low viscosity, swelling of the particles and hence of the photographic layers is limited, additional hardening is unnecessary and the particles remain insoluble under conditions of changing pH, e.g. in photographic processing baths.

Preparation of the aqueous dispersions of polymer particles used according to the present invention, which are capable of swelling by virtue of their hydrophilic character, may be carried out using known methods by inverse polymerization in a water-in-oil phase, using polyfunctional monomers which act as cross-linking agents. From 70 to 95% by weight of the monomers which are dissolved in the aqueous phase and required to be polymerized consist of a vinyl compound which contains carboxyl groups, optionally a compound of this type in the form of a salt, e.g. arylic acid, methacrylic acid, sulphoethylmethacrylate, arylamido-2-methyl propane sulphonic acid, styrene sulphonic acid, (meth) allylsulphonic acid and optionally minor proportions (from 0 to 25% by weight) of water soluble monomers such as acrylamide or N-vinyl-pyrrolidone. The aqueous phase also contains from 5 to 30% by weight of water soluble compounds which act as crosslinking agents, e.g. bis-acrylamides such as methylene-bis-acrylamide, glyoxal-bis-acrylamide, N,N'-dihydroxy ethylene-bis-acrylamide or N,N'-cystamine-bis-acrylamide, which compounds have been described e.g. by J. N. Hansen in Anal. Biochem. 76, pages 37–44 (1976), triacrylyldiethylene triamine as described in U.S. Pat. No. 3,607,393, (meth)acrylic acid esters of polyethers such as polyethylene glycol-400-diacrylate or polyethylene glycol-400-dimethacrylate, cationic bifunctional (meth) acrylic acid esters, e.g. as described in Polymer Letters Volume 7, pages 395–402 (1969), or divinyl sulphone.

Accelerators such as persulphates, peroxides, azodinitriles or peroxy esters are also preferably added to the aqueous phase to induce the polymerization reaction. For certain purposes, for example when products having an exceptionally high molecular weight are required, the primary step of forming the starting radicals advantageously takes place in the organic phase or at the phase interface and the radicals which release polymerization only reach the aqueous droplets by diffusion. In such cases, polymerization initiators soluble in organic solvents are preferably used.

As organic phase there are preferably used apolar organic solvents which are immiscible with water, e.g. higher boiling petroleum hydrocarbons such as cleaning petrol or ligroin, higher boiling paraffins such as $C_6$–$C_{16}$ hydrocarbons, or toluene, xylenes, perchloroethylene or carbon tetrachloride.

Various known water/oil emulsifiers may be used to emulsify the aqueous phase in the oil phase, preferably those having low HLB values (see company publication of Atlas Chemical Industries, 1963 "The Atlas HLB System"), preferably from 3 to 8. Examples of suitable emulsifiers include glycerol-mono-di-oleate, sorbitan-di-oleate, sorbitan-mon-oleate, -mono stearate, -mono laurate and -mono palmitate, polyethylene-glycerol mono-oleate, polyoxyethylene-sorbitan fatty acid esters, i.e. reaction products of 1 mol of the given sorbitan fatty acid ester with from 4 to 40 mol of ethylene oxide and polyethylene-sorbitan esters of fatty acids and resinic acids and mixtures thereof. A survey of emulsifiers suitable for the process according to the present invention and their HLB values is given by F. Hölscher in the treaties entitled "Dispersionen synthetischer Hochpolymerer" from the series "Chemie, Physik und Technologie der Kunststoffe in Einzeldarstellungen" (Springer Verlag 1969), pages 58 and 59 and in Schlick, "Non-ionic Surfactants", Volume 1, pages 609 to 611.

Various known mixing apparatus with a high shear gradient may be used as dispersion apparatus for the preparation of the water-in-oil emulsions.

After termination of the polymerization reaction, the emulsion is broken down, e.g. by the addition of a water miscible organic solvent such as methanol or acetone, and the precipitated reaction product is filtered off, washed and redispersed in water. This procedure is described in more detail in Examples 1 to 3 given below.

The polymer particles used according to the present invention are also readily prepared by polymerization of an oil-in-water emulsion. In that case, readily saponifiable polymerizable esters should be polymerized in the presence of an unsaponifiable polyfunctional cross-linking agent and the resulting polyester should be converted into a polymer salt dispersion by the addition of alkali. Examples of suitable polymerizable esters include methyl acrylate, ethyl acrylate, propyl acrylate, methyl methacrylate and ethyl methacrylate.

Compounds which are largely insoluble in water may be used as polyfunctional cross-linking agents, e.g. divinyl benzene, trivinyl cyclohexane, trivinyl benzene, 2,3,5,6-tetrachloro-1,4-divinyl benzene, esters of unsaturated acids with unsaturated alcohols, e.g. vinyl crotonate, allyl methacrylate, allyl crotonate, esters of unsaturated acids with polyfunctional alcohols, e.g. trimethylol propane trimethacrylate, neopentyl glycol dimethacrylate, butanediol dimethacrylate, 1,6-hexane-diol-diacrylate, 1,5-pentanediol-diacrylate, pentaerythritol-triacrylate, tetraethylene glycol-diacrylate, triethylene glycol diacrylate, esters of unsaturated alcohols with polyfunctional acids, e.g. diethyl phthalate and unsaturated polyethers, e.g. triethylene glycol-divinyl ether. Other suitable cross-linking agents have been described, for example, in Houben Weyl, Methoden der Organischen Chemie, Volume XIV/1, pages 32–33.

The procedure using an oil-in-water emulsion is described in Example 8.

The features of the process described below are particularly important in determining the properties of the polymer particles prepared by the two polymerization processes.

The swelling properties of the dispersed particles is, in the case of both processes, largely influenced by the quantity of cross-linking agent available during the reaction. Larger quantities of cross-linking agents result in less swelling.

The second process mentioned above results in smaller polymer particles than the first process, the particles produced by the second process having a maximum size of $0.3\mu$. Even these particles are virtually fast to diffusion so that their action is fixed in the layer in which they are contained. If the particles are present in a proportion of 25% by weight or more, based on the binder content of the layer, they impart sufficient electric conductivity to the layer to prevent electrostatic charges as well as accidental exposure in photographic materials. The aqueous dispersions of these polymer particles are also distinguished by their low viscosity, which is advantageous for casting. The swelling factor in water can be influenced, as already explained above, by the cross-linking of the particles during their preparation, so that with the polymer particles used according to the present invention it is possible to obtain photographic layers which have special swelling characteristics. Furthermore, the good swelling properties of the polymer particles used according to the invention present in photographic layers can assist the penetration of photographic processing liquids into these layers.

The polymer salt dispersions used according to the present invention may be incorporated into the usual photographic layers which contain gelatine or other natural or synthetic polymers as binders. In other words, the dispersions can be incorporated into both light sensitive emulsion layers and light insensitive photographic auxiliary layers such as protective layers, intermediate layers, filter layers or backing layers. The dispersions would however, be mainly used in layers which are situated on the outside of photographic materials, for example the exposed silver halide emulsion layers, protective layers and/or backing layers, depending on whether it is the matting properties or the electrostatic properties of the polymer particles which are important. On the other hand, it may be advantageous to achieve matting in layers situated on the inside of a photographic multi-layered material, e.g. intermediate layers or filter layers, in cases where damage due to contact patches, tearing or sticking is to be prevented in the individual stages of the process of preparing a multilayered photographic material.

The polymer salt dispersions used according to the present invention are generally added to the casting compositions of photographic layers in such quantities that from 5 to 30% by weight, preferably from 15 to 25% by weight of the gelatine in the casting composition is replaced by polymer particles in the case of protective gelatine layers and from 20 to 80% by weight, preferably from 30 to 50% by weight of the gelatine is replaced in the case of back coating layers. These weights are based on the dry weight of gelatine.

As already mentioned above, the polymer particles used according to the present invention may also be used as binder in the silver halide emulsion layers. The swelling velocity of the layers can thereby be increased and hence photographic processing speeded up. Satisfactory results are obtained in such cases by the addition of from 10 to 30% by weight, based on the dry weight of gelatine in the layer.

The matting effect in gelatine layers obtained with the polymer particles used according to the present invention is distinguished by its exceptional stability. The polymer dispersions in organic dispersing agents hitherto available for the preparation of matt layers, on the other hand, have distinct disadvantages especially if, for example, in order to prepare matted protective layers, the cast layer is rapidly dried at elevated temperatures. Such drying conditions invariably reduce the matting effect and when such photographic materials are developed, the original matting is also partly or completely lost. The reasons for this are not understood in detail.

Dispersions in which the particles have a swelling factor of from 20 to 30 have proved to be particularly advantageous in their matting effect. Swelling factors in this range can easily be obtained, as already explained, by varying the quantity of cross-linking agent used for polymerization. Higher proportions of crosslinking agent cause lower swelling and vice versa.

The use of the polymer salt dispersions according to the present invention is by no means restricted to photographic layers which contain gelatine as binder. The layers may contain water soluble high molecular polymer compounds in addition to, or instead of, gelatine, particularly compounds such as polyvinyl alcohol, sodium salts of polyacrylic acid and copolymers containing carboxyl groups, polyvinylpyrrolidone, polyacrylamide and high molecular natural substances such as dextrans, dextrines, starch ethers, alginic acid and its derivatives, cellulose acetate or cellulose sulphate.

An interesting possibility for the preparation of antistatic back coating layers lies in the use of synthetic organic polymers in the form of *aqueous latex dispersions* as binders in combination with the polymer salt dispersions used according to the present invention. Examples of latex dispersions which are suitable as binders for this purpose include polyvinyl propionate, butadiene-styrene copolymers, (meth) acrylate homopolymers and copolymers, polyvinyl esters and polyvinylidene chloride.

The quantity of polymer salts used in combination with such latex dispersions may be from 25 to 70% by weight, preferably from 30 to 50% by weight, based on the dry weight of the layer in which the latex dispersions are the only binders. The advantage of such antistatic layers lies in their firm adherence to hydrophobic surfaces and their insolubility in water.

The size of the polymer particles prepared by the process described above can easily be determined microscopically. An optical microscope is sufficient for observing particles above $0.5\mu$, but electron microscopic pictures are preferably used for smaller particles. To obtain these, the dispersion and the gelatine solution are cast together to form a layer from which fine sections $0.1\mu$ thick are formed after drying. These sections can then be used to produce electron microscopic pictures from which the particle size is determined. From 5 to 30% by weight of the dispersion are used with from 95 to 70% by weight of gelatine for preparing samples for measurement.

The amount of swelling of the particles at a pH value of 7 is determined by centrifuging. This is continued until no further change in the volume of sediment is observed. The supernatant water is poured off and the swelling factor is calculated from the solid content of the dispersion $G_1$ and the weight of the sediment $G_2$ using the equation $Q_G = G = G_2/G_1$. The swelling velocity in $\mu$/sec given in the Examples denotes the increase in thickness of the layer when left in water at pH 10.

The swelling factor of the smaller polymer particles prepared by the second process described is determined as follows: a serial dilution of the dispersion is prepared, in which the solid content is varied from 2% by weight to 20% by weight. The viscosities of the individual samples at pH 7 are then determined using a rotation viscosimeter. The viscosities in cP are then plotted against the concentrations of the individual samples. The curve obtained from the individual points on the graph has a kink at a certain concentration K. This concentration K is taken as a measure of the swelling, the swelling factor being defined as $Q_G = (100/K)$.

The following method is used for determining the surface resistances of the layers containing the particles of the invention: a sample measuring $12 \times 12$ cm is conditioned in an atmosphere of 50% relative humidity at 23° C. for 24 hours. Metal electrodes 10 cm long are then placed 1 cm apart on the surface of the sample, and the electric resistance is measured using an ordinary commercial high resistance ohmmeter.

The present invention is illustrated by the following Examples.

EXAMPLE 1

20 g of acrylic acid, 2 g of N,N'-methylene-bis-acrylamide, 13.4 g of potassium hydroxide and 0.12 g of sodium persulphate were dissolved in 50 ml of de-ionised water with cooling. The aqueous solution obtained was emulsified in a solution of 10 g of glycerol mono/dioleate in 90 ml of cleaning petrol with the aid of a high speed stirrer until the particle size was uniform and showed no signs of further change when examined under the the microscope.

The dispersion was polymerized under a nitrogen atmosphere in a flask equipped with a reflux condenser and afterwards heated for 15 minutes. After cooling, the dispersion was screened to remove agglomerates. To work up the dispersion, it was broken down with methanol and the precipitate was filtered, washed with methanol, taken up with 500 ml of water and vigorously stirred. The particle size of the resulting dispersion was from 1 to $2\mu$ and the swelling factor was 10.

EXAMPLE 2

2.1 20 g of acrylic acid, 2.5 g of N,N'-methylene-bis-acrylamide, 9.6 g of sodium hydroxide and 0.25 g of sodium persulphate were dissolved in 35 ml of water with cooling and emulsified in a solution of 5 g of sorbitan dioleate in 95 g of toluene. Polymerization was carried out as described in Example 1. Precipitation and washing were carried out in acetone. The product was then dispersed in water.

The procedure described under 2.1 was repeated using the quantities of cross-linking agent given in the following table. The dispersions obtained (2.2, 2.3 and 2.4) had particle sizes of from 1 to 2µ and the following swelling factors:

|  | 2.1 | 2.2 | 2.3 | 2.4 |
|---|---|---|---|---|
| Cross linking agent (g) | 2.5 | 2.0 | 1.5 | 1.0 |
| Swelling factor | 8 | 14 | 25 | 39 |

EXAMPLE 3

20 g of acrylic acid, 1.5 g of N,N'-methylene-bis-acrylamide, 15.5 g of potassium hydroxide and 0.2 g of sodium persulphate were dissolved in 30 ml of water with cooling and emulsified in a solution of 10 g of glycerol mono/dioleate in Decalin. The aqueous dispersion obtained after the reaction and working up of the product with acetone and methanol as described in Example 1 had a particle size of from 1 to 1.5µ and a swelling factor of 15.

The dispersions prepared according to Examples 1 to 3 are eminently suitable for matting and for improving the electric conductivity of protective layers of photographic materials. The advantageous effect of the polymer particles as matting agents is illustrated in the following two Examples.

EXAMPLE 4

Preparation of a matted protective layer.

A silver iodo bromide gelatine emulsion (3 mol percent silver iodide) containing 80 g of silver halide and 80 g of gelatine per liter of emulsion was applied to a layer substrate of cellulose triacetate. When the emulsion layer was dry, the material was divided into 30 parts.

On the emulsion side of each of the 30 samples was applied a protective layer of gelatine which had been ashed with alkali and which contained, based on the dry weight of gelatine, 0, 5, 10 and 20 and 30% by weight, respectively of the polymer particles prepared according to Examples 1 to 3. The protective layer when dry weighed 1.6 g/m².

The formation of Newton colour rings was used to test the degree of matting of the individual samples. For this purpose, each sample was pressed elastically against a glass plate using a pressure of 1 kp/cm² and the number of colour rings formed by interference between the surface of the protective layer and the glass plate way assessed visually. The results were graded as follows:

1 represents no interference (optimum matting)
2 represents very slight interference
3 represents slight interference
4 represents medium interference
5 represents strong interference
6 represents very strong interference (no matting).

The results of the interference tests are shown in the following table:

| Polymer particles according to Example | Proportion of polymer particles in the protective layer in % by weight, based on the dry weight of the layer | | | | |
|---|---|---|---|---|---|
|  | 0 | 5 | 10 | 20 | 30 |
| 1 | 6 | 4 | 3 | 2 | 1 |
| 2.1 | 6 | 5 | 3 | 2 | 1 |
| 2.2 | 6 | 4 | 3 | 2 | 1 |
| 2.3 | 6 | 3 | 2 | 1 | 1 |
| 2.4 | 6 | 3 | 2 | 1 | 1 |
| 3 | 6 | 4 | 3 | 2 | 1 |
| Comparison Polymethylmethacrylate particle size 1–2µ | 6 | 5 | 4 | 3 | 2 |

Polymer particles measuring from 1 to 2µ according to Belgian Pat. No. 766,853 were used for the comparison tests.

EXAMPLE 5

Example 4 was varied as follows.

Compositions for protective layers containing 10% by weight, 20% by weight and 30% by weight, based on the dry weight of the layer, of the polymer particles according to Example 2.3 were applied to a solidified, but not yet dried, silver iodo bromide gelative emulsion layer and the two layers were dried together. Drying was carried out extremely slowly (30 minutes) or extremely rapidly (3 minutes), at 20° C. in air containing 10 g of water per kg of air or at 30° C. in air containing 5 g of water per kg of air. Matting of the samples was tested both before and after development of the silver halide layers, using the test method described in Example 4. The results are given below.

| Treatment of the samples | Percent by weight, based on the dry weight of the layer of polymer particles in the protective layer | | |
|---|---|---|---|
|  | 10 | 20 | 30 |
| Slow drying: |  |  |  |
| undeveloped | 2 | 1 | 1 |
| developed | 2 | 1–2 | 1 |
| Rapid drying: |  |  |  |
| undeveloped | 2 | 1–2 | 1 |
| developed | 2 | 2 | 1 |
| Comparison: |  |  |  |
| Slow drying: |  |  |  |
| undeveloped | 4 | 3 | 2 |
| developed | 4 | 4 | 3 |
| Rapid drying: |  |  |  |
| undeveloped | 5 | 4 | 4 |
| developed | 5 | 5 | 5 |

Polymer particles (particle size 1–2µ) of polymethyl methacrylate which are known as matting agents were used for the comparison tests. The particles were added as a dispersion to the casting composition of the protective layer.

In contrast to the known matting agents, the values obtained for the polymer particles used according to the present invention are subject to only slight fluctuations. The matting effect is virtually completely preserved.

As already mentioned, the polymer particles used according to the present invention are also eminently suitable for the improvement of the conductivity of photographic layers.

EXAMPLE 6

Gelatine layers containing 60% by weight and 70% by weight, based on the dry weight of the layer, of the polymer particles according to Examples 1, 2.1 and 2.3 were applied in a thickness of $1\mu$ to a cellulose triacetate film covered with an adhesive layer. The surface resistances of the layer samples containing the polymer particles used according to the present invention were then compared with those of the gelatine layers not containing such additives. The results are given in in the following table. (The resistance measurements were carried out at 23° C. and 50% relative humidity).

| Polymer particles according to Example | percent by weight, based on the dry weight of the layer | $\Omega$ |
| --- | --- | --- |
| — | — | $2 \times 10^{11}$ |
| (Gelatine layer not containing additive) | | |
| 1 | 60 | $5 \times 10^8$ |
| | 70 | $1 \times 10^8$ |
| 2.1 | 60 | $7 \times 10^8$ |
| | 70 | $3 \times 10^8$ |
| 2.3 | 60 | $2 \times 10^8$ |
| | 70 | $6 \times 10^8$ |

A surprising increase in the electric conductivity is found when the aqueous dispersion are used in combination with lactices as binders instead of gelatine, a possibility which is particularly interesting for the preparation of antistatic layers.

EXAMPLE 7

The dispersions according to Example 2.1 and 2.3 having the differing swelling factors of 8 and 25, respectively, were again used. The binder was a 33% aqueous dispersion of the polyaddition product of a polyester of adipic acid, 1,6-hexanediol and neo-pentyl glycol (30/22/12), 1,6-hexanediisocyanate and sodium-γ-amino propane-phosphatemonomethyl ester corresponding to Compound 1 of German Offenlegungsschrift No. 1,522,393. The proportion of polymer salt particles in the dry layer was from 30 to 60% by weight. After the application of 2 g/m² (dry layer) to a cellulose triacetate layer substrate, the layers were found to have the following surface resistances in under normal atmospheric conditions (23° C., 50% r.h.):

| Polymer particles corresponding to | Proportion of polymer particles (% by weight, based on the dry weight of the layer) | | | |
| --- | --- | --- | --- | --- |
| | 30 | 40 | 50 | 60 |
| Example 2.1 | $4 \times 10^8$ | $9 \times 10^7$ | $4 \times 10^7$ | $2 \times 10^7$ |
| Example 2.3 | $6 \times 10^8$ | $2 \times 10^8$ | $8 \times 10^7$ | $2 \times 10^7$ |

Layers which also contained 2 g of solid substance per m² but from 30 to 60% by weight of gelatine, based on the dry weight of the layer, instead of the polymer particles were used for comparison. The surface resistances of the comparison layers were from $10^{10}$–$10^{11} \Omega$.

Other latices apart from the dispersion of an ionic polyurethane used as binder in the present example may also be used in combination with the polymer salt dispersion used according to the present invention. Examples of such latices are given in the following table. Layers consisting of 50% by weight, based on the dry weight of the layer of the polymer salt according to Example 2.3 and 50% by weight of the latices given in the table were prepared. Layers of 2 g/m² were applied. Their surface resistances were determined at 23° C. and 50% r.h. The results are given below:

| | $\Omega$ |
| --- | --- |
| Prepiophan 70 D, produced by BASF AG Ludwigshafen for a 50% aqueous dispersion of a polyvinyl propionate: pH 5–7; density 1.03; particle size 0.5–3 $\mu$ | $1 \times 10^7$ |
| Bunatex K 71, produced by Chemische Werke Huls AG, Marl, for a 68% aqueous dispersion of a butadiene-styrene copolymer; pH 10.5 | $8 \times 10^6$ |
| Acronal ST 420 D, produced by BASF AG, Ludwigshafen, for a 42% aqueous dispersion of an acrylic acid ester copolymer; pH 3.5–4.5; density 1.05 | $8 \times 10^6$ |
| Acronal 570 D, produced by BASF AG, Ludwigshafen, for a 50% aqueous dispersion of an acrylic acid ester copolymer; pH 8–9. density 1.07; particles size 0.2 $\mu$ | $1 \times 10^7$ |
| Viennapas EP 1, produced by Wacker-Chemie GmbH, Munich, for a 50% aqueous dispersion of a copolymer of vinyl acetate and ethylene; pH 4; density 1.05; particle size 0.5–2 $\mu$ | $4 \times 10^6$ |
| Viennapas EV 2, produced by Wacker-Chemie GmbH, Munich, for a 50% aqueous dispersion of a copolymer of vinyl acetate/ethylene: pH 4; density 1.05; particle size 0.5–2 $\mu$. | $7 \times 10^7$ |

The following Example describes the preparation of a polymer salt dispersion in two stages, in which the latex prepared by water/oil (W/O) emulsion polymerization of the first stage is saponified in the aqueous phase in the second stage.

EXAMPLE 8

First stage:

23 g of a sodium dodecyl diphenyl ether disulphonate are introduced was wetting agent into a reaction vessel containing 3,400 g of de-ionised water. The reaction mixture is heated to 75° C. with the introduction of nitrogen and vigorous stirring. When this temperature has been reached, 200 g of a monomer mixture of 1,245 g of freshly distilled methyl acrylate and 50 g of freshly distilled trivinyl cyclohexane are added dropwise within 15 minutes. After approximately 10 minutes, when the reaction temperature has returned to 75° C., 8 g of an initiator solution of 8.25 g of potassium peroxy disulphate in 260 g of distilled water are run in. The reaction temperature then rises to 81°–83° C. As soon as this temperature has been reached, the remainder of the monomer mixture is added dropwise at such a rate that the temperature is maintained at from 80° to 83° C. Approximately 30 minutes after addition of the remaining two thirds of the monomer solution is begun, addition of the remainder of the initiator solution is started in such a way that the two solutions are introduced approximately simultaneously. The reaction mixture is then stirred for 30 minutes at a reaction temperature of from 80° to 83° C. An 80% solution of 800 mg of tertiary butyl hydroperoxide and 400 mg of the above-mentioned wetting agent in 4.5 g of de-ionised water is then added, as well as a solution of 800 mg of ascorbic acid in 87 g of water. Stirring is continued for a further 2 hours at from 80° to 83° C. When the reaction mixture is cold, small quantities of precipitated product are removed by filtration through a wire mesh having 10,000 meshes per square centimeter. No particles greater than 0.4μ should be visible under the microscope. Second stage:

A solution of 101 g of KOH in 2.5 liters of water is carefully added at room temperature over a period of 30 minutes to 2,560 g of the latex prepared above so that no flocculation of the latex occurs. The mixture is then stirred for 7 hours at room temperature. After this initial phase of saponification, the reaction mixture is heated to an external temperature of 120° C. for 6.5 hours whilst it is stirred (vigorous foaming) and a solution of 223 g of KOH in 875 ml of water is then slowly added over a period of 1 hour. Stirring is then continuated at an external temperature of 120° C. for a further 20 hours until the pH value is from 10 to 10.4. Any methanol formed and residual monomer should be removed via a bridge. When the desired pH value has been reached, the reaction mixture is diluted to a solid content of 10% with water.

8.1

100 g of trivinyl cyclohexane are used instead of 50 g of trivinyl cyclohexane in the monomer mixture of Example 8.

8.2

200 g of trivinyl cyclohexane are used instead of 100 g of trivinyl cyclohexane in the monomer mixture of

EXAMPLE 8.1

The particle size of the resulting products was from 0.06 to 0.08μ and the swelling factors were 13.7 and 4.5, respectively.

EXAMPLE 9

The polymer particles prepared according to Example 8 are made up into layers as described below to determine their antistatic properties:

The dispersions of polymer particles from Examples 8, 8.1 and 8.2 diluted to a solid content of 3% by weight are mixed with 3% by weight aqueous gelatine solutions having a pH value of 7 so that the mixtures contain 50, 40, 33 and 25% by weight of the polymer particles used according to the present invention. The mixtures are applied in thicknesses corresponding to 50 ml/m² both to a cellulose triacetate substrate and to a 10μ thick gelatin layer on a cellulose triacetate subsate, and dried. The resulting layers weigh 1.5 g/m². The samples were stored for 1 day at 23° C. and at 50% r.h. The surface resistances obtained as follows:

| Proportion of polymer particles in % by weight | Polymer particles according to example: | | | | | |
|---|---|---|---|---|---|---|
| | 8 | | 8.1 | | 8.2 | |
| | Cast on: | | | | | |
| | Cellulose triacetate | Gelatine | Cellulose triacetate | Gelatine | Cellulose triacetate | Gelatine |
| 50 | $10^6$ | $10^6$ | $10^6$ | $10^6$ | $10^6$ | $10^6$ |
| 40 | $5 \times 10^6$ | $1 \times 10^7$ | $5 \times 10^6$ | $1 \times 10^7$ | $3 \times 10^7$ | $9 \times 10^7$ |
| 33 | $1 \times 10^7$ | $2 \times 10^7$ | $1 \times 10^7$ | $1 \times 10^7$ | $2 \times 10^8$ | $9 \times 10^8$ |
| 25 | $5 \times 10^8$ | $2 \times 10^9$ | $1 \times 10^9$ | $8 \times 10^9$ | $3 \times 10^{10}$ | $3 \times 10^{10}$ |

| Proportion of polymer particles in % by weight, based on the dry weight of the layer | Cast on: | |
|---|---|---|
| | Cellulose triacetate | Gelatine |
| Comparison: Na-Polyacrylate | | |
| 50 | $2 \times 10^6$ | $6 \times 10^9$ |
| 40 | $7 \times 10^7$ | $9 \times 10^9$ |
| 33 | $4 \times 10^8$ | $8 \times 10^9$ |
| 25 | $1 \times 10^9$ | $2 \times 10^{10}$ |

The results show that the electric resistances of the layers cast on gelatine are only slightly higher than those of layers cast on acetate film. In the samples case on gelatine, the comparison values for sodium polyacrylate entered in the table are higher by two powers of ten due to diffusion of the polymer salts into the adjacent gelatine layer.

Another striking feature is the difference in surface resistances when the layers contain 25% by weight, based on the dry weight of the layer, of polymer particles. It can be seen that these are mainly due to the different swelling capacity of the polymer particles. The swelling factor of the particles decreases from 13 to 4.5 from Example 8 through 8.1 to 8.2. The surface resistance of these samples at the same time falls by two powers of ten.

EXAMPLE 10

The following series of tests demonstrates the dependence of the surface resistance on the pH of the casting solution from which the layers containing the polymer particles used according to the present invention were prepared.

Samples of a mixture containing 25% by weight of the polymer particles according to Example 8 and 75% by weight of gelatine were applied in a quantity of 1.5 g/m² to the cellulose triacetate substrate used in Example 9. The pH of the individual mixtures ready for casting was adjusted to 5, 6, 7, 8, 9 and 10, respectively, using a commercial pH meter with glass electrode. The surface resistances of the sample layers were determined after one day's storage at 23° C. and at 50% r.h. The results are summarized in the following table:

| pH | 5 | 6 | 7 | 8 | 9 | 10 |
|---|---|---|---|---|---|---|
| Surface resistance (Ω) | $6 \times 10^{10}$ | $2 \times 10^{10}$ | $3 \times 10^8$ | $3 \times 10^7$ | $1 \times 10^7$ | $6 \times 10^6$ |

As the results show, the influence of the pH of the casting mixture on the surface resistance of the resulting layers is exceptionally powerful, and it is therefore important in practice to use casting solutions having a pH value of 7 or higher. The photographic layers above and below these layers should, if possible, also have a pH value of 7 because a lower pH value in adjacent layers may have a deleterious effect on the antistatic properties of the layer containing the polymer particles used according to the present invention.

EXAMPLE 11

The following comparison demonstrates the similarity between the swelling of the polymer particles used according to the present invention and that of gelatine.

Gelatine layers containing 30% by weight, based on the dry weight of the layer, of the polymer particles according to Examples 8, 8.1 and 8.2 were prepared. The gelatine was hardened in the casting mixture, using a 0.3% by weight of chrome alum and 0.6% by weight of triacryloformal, based on the total solid content of the casting mixture. The thickness of the layer was 10μ. Swelling of the sample layers ws determined after one day's storage at 23° C. and 50% r.h., using water having a pH value of 10 by the method previously described.

|  | Pure gelatine | Gelatine mixture containing polymer particles according to Example: | | |
|---|---|---|---|---|
|  |  | 8 | 8.1 | 8.2 |
| Swelling factor | 5.0 | 6.2 | 4.5 | 3.2 |
| Swelling velocity μ/sec. | 3.5 | 8.2 | 7.1 | 6.6 |

The results show that the polymer particles used according to the present invention have no deleterious effect on the swelling properties of gelatine when they are used in a mixture with gelatine. The swelling properties of gelatine are of major importance for the development kinetics of photographic gelatine layers.

EXAMPLE 12

The aqueous dispersions of polymer particles prepared as described in Example 8 can be advantageously used in combination with aqueous dispersion of other polymers for preparing antistatic layers.

The following commercially available polymer dispersions were mixed with the dispersion from Example 8.1 so that the resulting mixture contained 33% by weight of the polymer particles according to Example 8.1:

(a) Diofan 180 D, produced by BASF AG, Ludwigshafen, for a 45% aqueous dispersion of copolymers based on polyvinylidene chloride; pH 2.5–5.5; density 1.23; particle size 0.15μ.

(b) Acronal 290 D, produced by BASF AG, Ludwigshafen, for a 50% aqueous dispersion of a copolymer based on acrylic acid esters; pH 7.5–9; density 1.04; particle size 0.1μ.

(c) Vinnapas EV 1, produced by Wacker-Chemie, Munich, for a 50% aqueous dispersion of a copolymer based on vinylacetate/ethylene; pH 3.8–4.2; density 1.05; particle size 1μ.

The mixtures were cast on layer substrates of cellulose triacetate (I), polyethylene terephthalate (II), polyethylene (III) and polyvinyl chloride (IV) in quantities forming layers having a solid content of 2 g/m². After drying and one day's storage at 23° C. and at 50% r.h., the surface resistances (Ω) of the layers were measured. The results are shown in the following table.

| Mixture | Layer substrate | | | |
|---|---|---|---|---|
|  | I | II | III | IV |
| (a) | $3 \times 10^7$ | $2 \times 10^7$ | $9 \times 10^7$ | $1 \times 10^8$ |
| (b) | $5 \times 10^7$ | $5 \times 10^7$ | $8 \times 10^7$ | $4 \times 10^7$ |
| (c) | $5 \times 10^7$ | $8 \times 10^7$ | $2 \times 10^8$ | $3 \times 10^7$ |

Comparison layers containing 33% by weight of the same dispersion and 97% by weight of gelatine applied to layer substrates I to IV also had resistances in the region of $1 \times 10^7$ but they showed little or no adherence to hydrophobic surfaces. The layers according to (a) to (c), on the other hand could be steeped in water at 50° C. They are thus shown to be completely insoluble.

We claim:

1. A photographic light sensitive material having at least one silver halide emulsion layer, characterized in that at least one of the layers other than a layer containing silver halide, contains an additive insoluble in photographic processing consisting of a cross-linked polymer of acrylic acid or methacrylic acid which has a particle size in the dry state of from 0.01 to 5μ and a swelling factor in water limited to from 4 to 40, which polymer was prepared by crosslinking in covalent bonds either:

(a) by inverse emulsion polymerization (water-in-oil) of 75% to 95% by weight acrylic or methacrylic acid monomers in the presence of water-soluble polyfunctional cross-linking monomers and an emulsifier, breaking down of the emulsion and redispersion of the polymer particles in water; or (b) by emulsion polymerization of short chained aliphatic esters or acrylic or methacrylic acid in water in the presence of unsaponifiable and substantially water insoluble polyfunctonal cross-linking monomers and an emulsifier, followed by saponification of the polymer, said particles being resistant to diffusion.

2. A material according to claim 1, characterized in that polymer particles measuring from 1 to 3μ and having a swelling factor of from 8 to 40, are contained in an outer gelatine-containing layer in a quantity of from 5 to 30% by weight, based on the dry weight of the layer.

3. A material according to claim 1, characterized in that polymer particles measuring from 1 to 3μ and having a swelling factor of from 8 to 40, dispersed in a back layer in a quantity of from 25 to 70% by weight, based on the dry weight of the layer.

4. A material according to claim 1, characterized in that polymer particles measuring from 0.01 to 0.3μ, and having a swelling factor of from 3 to 14, are contained in an outer gelatine-containing layer in a quantity of from 25 to 50% by weight, based on the dry weight of the layer.

5. A material according to claim 1, characterized in that polymer particles measuring from 0.01 to 0.3μ and having a swelling factor of from 3 to 14 dispersed in a synthetic organic polymer as binder are contained in a back layer in a quantity of from 25 to 70% by weight, based on the dry weight of the layer.

6. A material according to claims 2, 3 or 5, characterized in that the layer containing the polymer particles has a pH value of from 7 to 10.

7. A material as claimed in claim 1 wherein the polymer particles have a particle size from 0.03 to 2μ.

* * * * *